Aug. 9, 1960 L. L. TAPP 2,948,256
TIRE PRESSURE INDICATOR
Filed Sept. 16, 1957
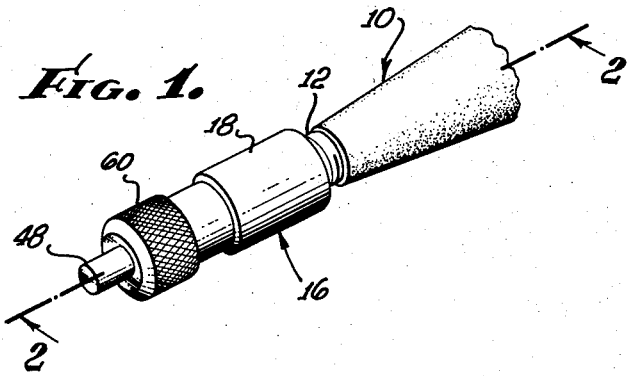
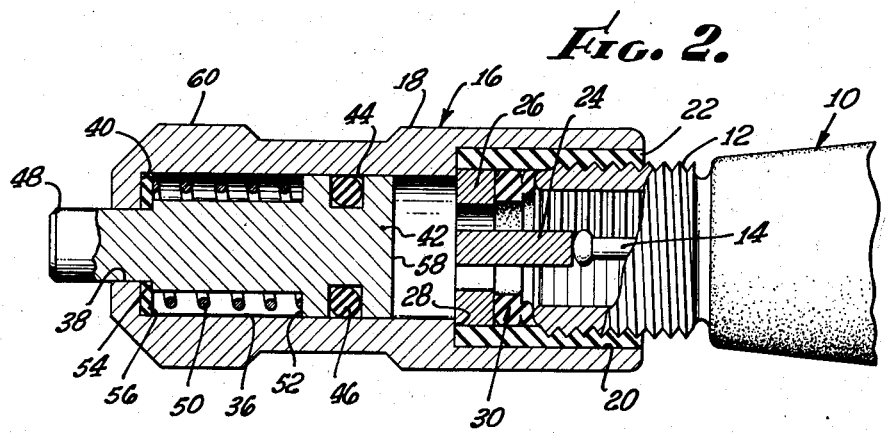
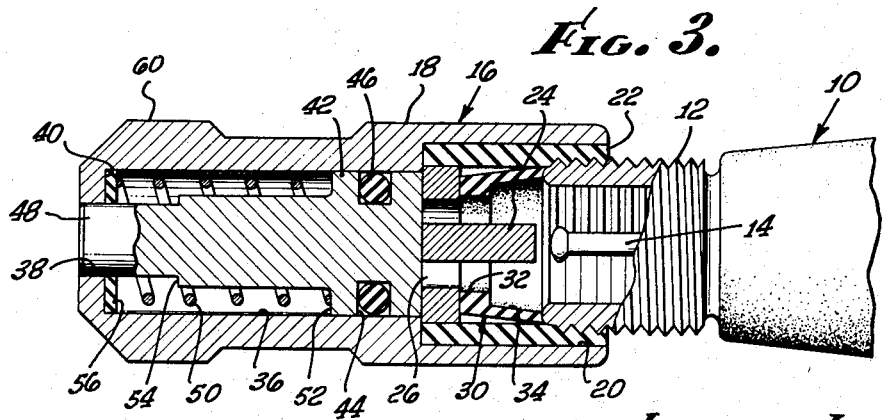
LEONARD L. TAPP
INVENTOR.
BY
ATTORNEY.

United States Patent Office 2,948,256
Patented Aug. 9, 1960

2,948,256

TIRE PRESSURE INDICATOR

Leonard L. Tapp, 12922 Shreve Road, Whittier, Calif.

Filed Sept. 16, 1957, Ser. No. 684,272

8 Claims. (Cl. 116—34)

My present invention relates to tire pressure indicating devices adapted to be attached directly to the valve of a vessel which contains gas under pressure, such as a pneumatic vehicle tire, and it relates particularly to a tire pressure indicator that is removably threadedly engageable to the valve stem of a pneumatic tire and having an external member which is movable in direct response to a reduction of the tire pressure to provide both a visual and a feelable indication of the tire pressure.

It is well known in the art to provide tire pressure indicating devices that are removably threadedly engageable with the valve stem of a tire. However, it has long been a problem in the art to provide such a tire pressure indicator which is dependable in operation and which will not leak, and also which will indicate the pressure condition of the tire to the observer at a glance, even when the indicating device has a covering of dirt thereon as is often the case. It has been a particular problem in the art to provide such a tire indicating device which, in addition to providing a visual indication of the tire pressure condition, will also indicate the pressure when the indicating device is felt, so that the condition of the tires can quickly and easily be determined even in the dark and without requiring the removal of dust and dirt from transparent windows.

A common type of prior art tire pressure indicator utilizes a pressure sensitive diaphragm which is designed to move in response to pressure changes in the tire. Such a pressure sensitive diaphragm must be strong, and hence relatively rigid, in order to withstand the air pressure in the tire. This strength and rigidity severely limits the amount of movement of any indicating means attached to the diaphragm, particularly because of the extremely small amount of space within which the diaphragm must be housed. Because of this difficulty, such prior art diaphragm actuated tire pressure indicators do not provide a satisfactory pop-in action, which is highly desirable.

Most prior art tire pressure indicating devices which have movable indicating members enclose these indicating members in a transparent sealing cover or window. This prevents the escape of any air from the tire out into the atmosphere, while at the same time permitting visual observation of the movable member. However, these transparent sealing covers or windows are often covered with dust and dirt and therefore difficult or impossible to read through. Also, the small size of the indicating member inside of the transparent cover, and also light reflections from the transparent cover, make this type hard to read even when the transparent window is clean.

Such prior art tire pressure indicating devices which enclosed a movable member within a transparent window could not be checked to determine the tire pressure by feeling the device, which made it difficult to determine the pressure condition of the tires at night or when the wheels were dirty.

In view of these and other problems in the art, it is an object of my present invention to provide a pressure indicating device adapted to be attached directly to the valve of a vessel which contains gas under pressure which includes a pin which projects externally from the body portion of the device and which is movable according to the pressure in the vessel whereby the pressure can be determined by either visually observing the position of the pin or by feel.

Another object of my present invention is to provide a pressure indicating device of the character described which indicates the pressure by an externally projecting, movable pin, which is substantially leakproof.

Another object of my present invention is to provide a tire pressure indicating device of the character described which includes a housing that is removably threadedly engageable over the conventional pneumatic tire valve stem, with a spring-loaded piston member slidably mounted within a cylinder in the housing, an extension on the piston member projecting outwardly from the housing against the force of the spring when the tire pressure is above a predetermined minimum pressure, and this projection being completely withdrawn in the housing by the spring when the tire pressure is reduced below the predetermined minimum pressure.

A further object of my present invention is to provide a tire pressure indicating device of the character described in which an internally threaded pliable sleeve member is fitted into the base portion of the device whereby this internally threaded pliable sleeve is threadedly engaged over the valve stem when the device is operatively engaged to the valve stem, this pliable sleeve providing an excellent sealing engagement between the pressure indicating device and the valve stem as soon as the threaded engagement commences.

An additional object of my present invention is to provide a tire pressure indicating device of the character described which includes a gasket member within the base portion of the indicating device, this gasket including a flexible lip member which operatively engages the front end of the valve stem to provide a seal between the indicating device and the valve stem as the device is being screwed onto the valve stem before the valve core is opened by the device to admit the tire pressure into the indicating device.

Other objects and advantages of my present invention will be apparent from the following description and claims, the novelty of my invention consisting in the features of construction, the combinations of parts, the novel relations of the members and the relative portioning, disposition and operation thereof, all as is more completely described herein and as is more particularly pointed out in the appended claims.

In the drawings, forming a part of my present specification:

Figure 1 is a perspective view of my presently preferred embodiment of my invention mounted on a conventional tire valve stem.

Figure 2 is a vertical section along the line 2—2 in Figure 1 illustrating the internal details of my present invention in its normal operative position with the tire pressure sufficient to hold the indicating pin in its outermost position.

Figure 3 is a vertical section similar to Figure 2 but with the tire pressure indicator only partially screwed onto the valve stem showing how my flanged sealing gasket operates before the valve core is moved, and illustrating my indicating pin in its withdrawn, innermost position.

Referring to my drawing, my present invention is adapted to be applied to the conventional pneumatic tire valve 10 having the usual threaded valve stem 12. My present tire pressure indicator is threadedly engaged over the external threads on the valve stem 12.

The conventional tire valve 10 includes the usual longitudinally movable core 14 within the valve stem 12, the valve 10 being opened by moving valve core 14 inwardly against spring pressure.

My tire pressure indicator 16 is housed in a generally cylindrically arranged body portion 18 which is slightly larger in diameter than the valve stem 12. The base portion of the body 18 is provided with a cylindrical recess 20 which is internally threaded for receiving a complementary externally threaded cylindrical sleeve 22 composed of a pliable material such as plastic, rubber or the like. The inner cylindrical surface of sleeve 22 is also threaded and is adapted to the operatively engaged over the valve stem 12 in the manner illustrated in the drawings.

Although I have found that my tire pressure indicator 16 will operate satisfactorily without the use of the pliable sleeve 22, and with the internally threaded cylindrical recess 20 in the body portion 18 having a smaller diameter so that it is directly threadedly engageable over the externally threaded valve stem 12, I have found that the use of the pliable sleeve 22 provides an immediate seal between the valve stem 12 and the body portion 18 of the tire pressure indicator 16 as the indicator 16 is threaded over the valve stem 12 so that there is no possibility of air leakage when the movable valve core 14 is depressed in the manner hereinafter described.

Also, though I provide a very efficient gasket sealing means hereinafter described in detail, the presence of the pliable sleeve 22 between the body portion 18 and the valve stem 12 further insures an excellent seal regardless of extensive use and wear of the tire pressure indicator 16. Further, by providing the pliable sleeve 22, manufacturing tolerances in the tire pressure indicator 16 are rendered as uncritical as possible.

I provide a centrally mounted boss 24 which is fixedly positioned within the cylindrical recess 20 of body portion 18, the boss 24 extending rearwardly and being fixedly mounted in a ring 26 which seats against the rearwardly directed annular shoulder 28 at the forward end of cylindrical recess 20. When the tire pressure indicator 16 is threadedly engaged over the valve stem 12, the boss 24 operatively engages the movable core 14, moving the valve core 14 to the right in Figures 2 and 3 of the drawings to open the tire valve 10 admitting air pressure into the tire pressure indicator 16. An excellent seal will be provided between the tire pressure indicator 16 and the valve stem 12 by the pliable sleeve 22 before the tire valve 10 is thus opened in order to prevent air leakage.

I presently prefer to provide external threads on the ring 26 and threadedly engage the ring 26 within the internally threaded bore of sleeve 22. Ring 26 may be thus threadedly engaged within sleeve 22 by a suitable tool (not shown) which is operatively engageable in the web between ring 26 and its central boss 24. Alternatively, the ring 26 may be directly threadedly mounted in the internally threaded cylindrical recess of body portion 18 with the sleeve 22 terminating at the ring 26 instead of at the shoulder 28.

I provide a sealing gasket 30 which is operatively engaged between the valve stem 12 and the sleeve 22 to provide a further seal. In its presently preferred form this gasket 30 includes a ring shaped base portion 32 which seats against the ring 26 and which has a central bore through which air under pressure from the tire valve 10 may be admitted. An integral lip portion 34 of gasket 30 extends rearwardly a sufficient distance to sealingly engage between the front of valve stem 12 and the sleeve 22 before the valve 10 is opened as the pressure indicator 16 is screwed onto the valve stem 12. Then as the pressure indicator 16 is further screwed into position on valve stem 12, the lip portion 34 of gasket 30 collapses as necessary, while still maintaining its seal.

My preferred gasket 30 as shown in the drawings and as above described is equally as effective regardless of whether or not a separate pliable sleeve 22 is employed, and positively prevents any escape of air when the valve core 14 is first engaged but before the tire pressure indicator 16 is fully seated over the threaded valve stem 12.

Heretofore, one of the problems encountered in most tire pressure indicators was that a certain amount of air leakage usually occurred when the valve core 14 was operatively engaged but before the indicator was fully seated over the valve stem 12. It will be apparent from the above description and from the drawings that I have provided two independently operable means for eliminating this leakage as the device is attached to the valve stem, namely, my pliable sleeve 22, and my novel gasket 30 which employs the flexible lip portion 34.

A cylinder 36 is axially disposed in body portion 18 forward of cylindrical recess 20 and in communication with recess 20. An opening 38 which is smaller in diameter than the cylinder 36 provides communication between cylinder 36 and the front end of body portion 18. Thus, the rearwardly directed shoulder 40 is provided at the front end of cylinder 36 adjacent to the opening 38.

A piston 42 is slideably mounted within the cylinder 36, and is provided with one or more grooves 44 which receive O-rings 46 to provide a sealing engagement between the piston 42 and the cylinder 36.

The indicating pin 48 is integrally connected to piston 42 extending forwardly of piston 42, with the forward end of pin 48 extending through the opening 38 at the forward end of body portion 18.

I provide a calibrated compression spring 50 which is mounted over indicating pin 48 within cylinder 36 and which abuts against the forwardly directed shoulder on piston 42 to normally urge the piston 42 and indicating pin 48 to a retracted, innermost position within the body portion 18. In this retracted position the piston 42 will seat against the ring 26, and the forward end of the indicating pin 48 will normally be substantially flush with the front surface of the body portion 18.

I provide a sealing ring 56 which is fitted within the cylinder 36 against the rearwardly directed shoulder 40 at front end of cylinder 36. This sealing ring 56 sealingly engages the forward end of the indicating pin 48 regardless of the positioning of piston 42 and indicating pin 48 to prevent any dirt, dust or other foreign matter from entering the cylinder 36, thus preventing any disturbance of the excellent seal provided between piston 42 and cylinder 36 by the O-ring 46.

The forward limit of travel of the piston 42 and indicating pin 48 is established by the forwardly directed shoulder 54 on indicating pin 48 within cylinder 36. When the tire pressure is sufficient to apply a force to the rear face 58 of piston 42 that will overcome the force of compression spring 50, the piston 42 and indicating pin 48 will be moved to the left in Figures 2 and 3 until the shoulder 54 on pin 48 seats in sealing engagement against the sealing ring 56. In this position of piston 42 and indicating pin 48 the forward end of pin 48 will protrude substantially beyond the front surface of the body portion 18, whereby this projecting tip of indicating pin 48 may readily be visually observed, regardless of the presence of dust and dirt on the pin 48 and the body portion 18. Also, the projecting pin 48 can be immediately felt by merely running a hand or finger over the forward end of the tire pressure indicator 16, so that the tire pressure condition can be quickly and easily determined, even in the dark.

I prefer to provide a brightly colored forward end on the indicating pin 48, this color being distinctive from the color of the body portion 18, whereby the projecting tip of pin 48 may be observed even from a distance. If the tip is thus observed it is not necessary to further investigate, as it indicates a sufficient tire pressure, whereby the pressures of all of the tires on a vehicle can usually be almost instantly checked by taking a quick look at the tire pressure indicators 16 on the respective tires.

It will be noted that during the normal operating condition of my tire pressure indicator 16 as shown in Figure 2 with the indicating pin 48 in its projecting position, the seating of forwardly directed shoulder 54 on indicating pin 48 against the sealing ring 56 will provide protection against the entry of foreign matter which is even more positive than the normal protection afforded by engagement of sealing ring 56 against the cylindrical surface of the forward part of indicating pin 48.

The compression spring 50 is calibrated to move the indicating pin 48 into its retracted position when the pressure in the tire falls below a predetermined minimum pressure. Thus, springs 50 of different compressive forces will be provided according to the desired minimum pressures for various types of tires and tire uses.

I prefer to provide knurled surface 60 on the outer part of body portion 18 in order to facilitate the mounting and removing of my tire pressure indicator 16.

It will thus be seen that I have provided a novel tire pressure indicator 16 which has several important advantages over conventional prior art tire pressure indicators. My indicator is so constructed that it will not leak any air from the tire during normal operation of the device, and I further provide my novel sealing gasket 30 and my novel pliable sleeve 22 which each independently function to prevent any air leakage as the valve core 14 is moved out of its seated position but before the tire pressure indicator 16 is fully seated over the valve stem 12.

Another important advantage of my present invention over the prior art is my utilization of a pressure indicating pin which, when the tire is above the desired predetermined minimum pressure, projects outwardly from the surface of the body portion of the device in such a manner that it is easily visible without any impediments such as supposedly transparent windows which might become covered with dirt, and which can be quickly and easily felt if it is necessary to determine the pressure condition of the tire in the dark. I provide a sufficient travel of my indicating pin between its projecting and its withdrawn positions so that when the pin projects it is a prominent protrusion from the surface of the body portion of the device, but when it is withdrawn, it is fully withdrawn substantially flush with the surface of the body portion of the device. By coupling my use of such an external indicating pin with my simple piston type of pin actuating means instead of the usual diaphragm type of actuator, I provide the desired large amount of movement of the pin, giving a satisfactory "pop-in" action.

It is to be understood that the form of my invention herein shown and described is my preferred embodiment and that various changes in the shape, size and arrangement of parts may be resorted to without departing from the spirit of my invention, or the scope of the appended claims.

I claim:

1. A tire pressure indicating device including a housing having a base portion with an internally threaded recess therein for threadedly engaging said housing over an externally threaded tire valve stem, abutment means mounted in said base portion and operatively engageable with the valve core in said valve stem to open the tire valve when said housing is threadedly engaged over the valve stem, a cylindrical chamber having an inner end and an outer end in said housing, the inner end of said chamber communicating with said recess and the outer end of said chamber communicating with the outside of said housing, a plunger slideably mounted in said chamber, said plunger including an inner portion in sealing engagement with the cylindrical wall of said chamber and an outer indicating portion extending out through the outer end of said chamber, said plunger being movable between an extended position in which the outer portion of said plunger projects a substantial distance outwardly from said housing and a retracted position in which the outer portion of said plunger is substantially withdrawn within said housing, and spring means mounted in said housing and operatively engaged with said plunger to urge said plunger toward a retracted position.

2. The device of claim 1 which includes a sealing gasket seated in said recess in said housing and sealingly engageable between said housing and the valve stem when said housing is threadedly engaged over the valve stem.

3. The device of claim 1 which includes a sealing gasket seated in the inner portion of said recess and having an outwardly directed, flexible annular lip, said annular lip sealingly engaging the valve stem during the final portion of the threaded engagement of said housing over the valve stem whereby a sealed connection between the housing and the valve stem will be established before the valve is opened as the housing is being threaded onto the valve stem.

4. The device of claim 1 which includes a pliable internally and externally threaded cylindrical sleeve threadedly mounted in said recess and threadedly engageable over the valve stem.

5. The device of claim 1 which includes a pliable internally and externally threaded cylindrical sleeve threadedly mounted in said recess and threadedly engageable over the valve stem, and a sealing gasket seated in the inner portion of said recess and having an outwardly directed flexible annular lip, said annular lip sealingly engaging the valve stem during the final portion of the threaded engagement of said pliable sleeve over the valve stem, whereby a sealed connection between the housing and the valve stem will be established before the valve is opened as the indicating device is being threaded onto the valve.

6. The device of claim 1 in which an O-ring is provided about said inner portion of said plunger to provide sealing engagement of said inner portion of said plunger against the cylindrical wall of said chamber.

7. The device of claim 1 in which a secondary seal is provided between said housing near the outer end of said chamber and said outer portion of said plunger, to seal the inside of said housing against the entry of foreign particles.

8. The device of claim 1 in which an O-ring is provided about said inner portion of said plunger to provide said sealing engagement of said inner portion of said plunger against the cylindrical wall of said chamber, with a secondary sealing ring being provided in said housing near the outer end of said chamber and sealingly engaged with said outer portion of said plunger to seal the inside of said housing against the entry of foreign particles.

References Cited in the file of this patent

UNITED STATES PATENTS

| | | |
|---|---|---|
| 1,044,779 | Hackley | Nov. 19, 1912 |
| 1,108,640 | Taylor | Aug. 25, 1914 |
| 1,289,712 | Evans | Dec. 31, 1918 |
| 1,449,010 | Lindbloom | Mar. 20, 1923 |
| 2,738,752 | Dascombe | Mar. 20, 1956 |